Dec. 20, 1927.

T. H. THOMAS 1,653,135

ELECTROPNEUMATIC BRAKE

Filed Feb. 23, 1927

INVENTOR
THOMAS H. THOMAS
BY Wm. M. Cady
ATTORNEY

Patented Dec. 20, 1927.

1,653,135

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed February 23, 1927. Serial No. 170,074.

This invention relates to electro-pneumatic brakes and more particularly to a brake equipment for electrically controlling the brakes on a locomotive and cars in a train.

The principal object of my invention is to provide an improved electro-pneumatic brake equipment of the type in which the brakes are controlled by current flow through a single train wire.

Figure 1:
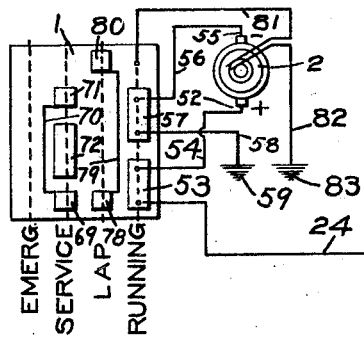
Figure 1:
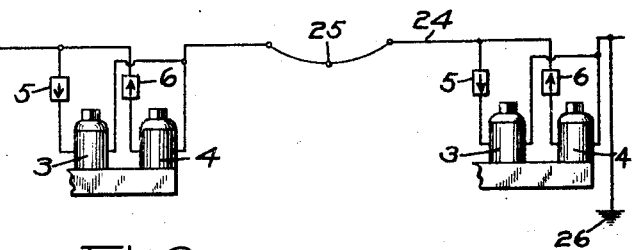
Figure 2:
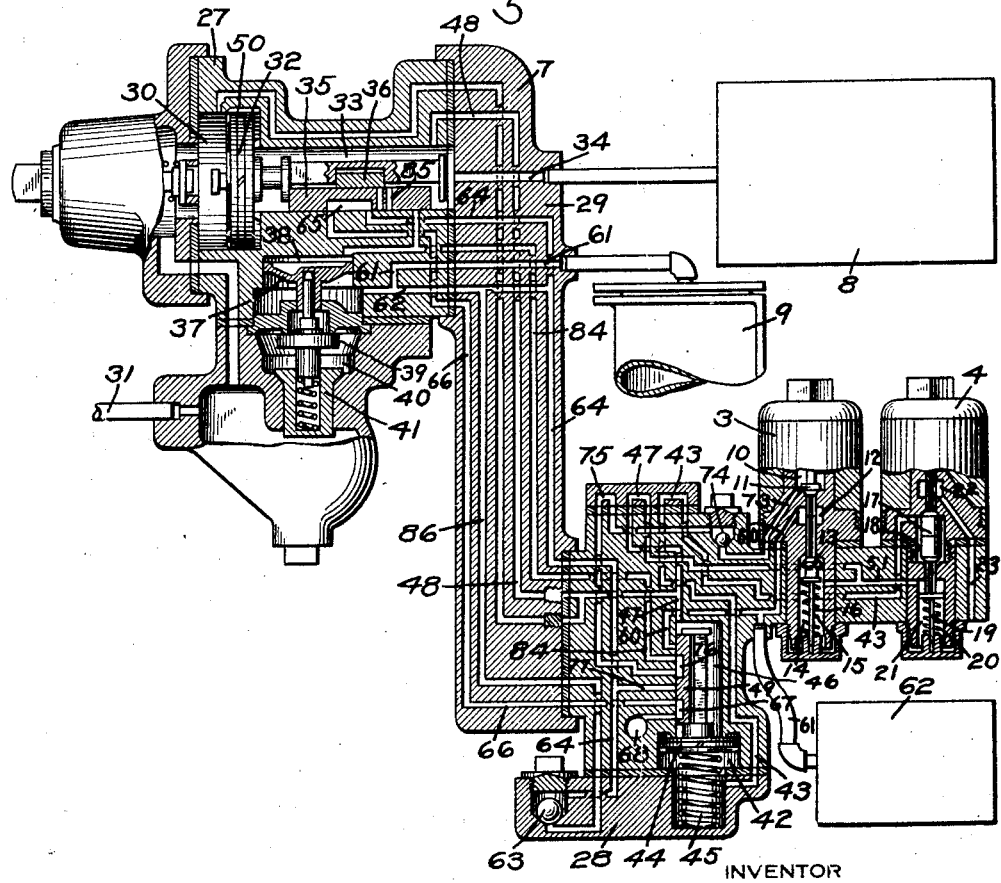

In the accompanying drawing; Fig. 1 is a diagrammatic view of an electrically controlled brake equipment, embodying my invention and employed on the locomotive and each car in the train; and Fig. 2 is a sectional, diagrammatic view of the electropneumatic brake equipment employed on the locomotive and each car in the train.

As shown in Fig. 1 in the drawing, the locomotive is equipped with a brake switch 1 and a combined alternating and direct current generator 2, while both the locomotive and cars are provided with a magnet valve device 3, a magnet valve device 4 and two rectifiers 5 and 6. The magnet valve devices 3 and 4 are associated with the electro-pneumatic apparatus 7 as shown in Fig. 2 of the drawing, in addition to the usual auxiliary reservoir 8 and brake cylinder 9.

The brake switch 1, shown in development form on the locomotive in Fig. 1, may comprise a contact drum, adapted to be operated by a handle; the rotation of said drum being adapted to effect the electrical connections in the various positions of the brake switch.

The generator 2 may be of such construction as to produce both alternating and direct current, the current from which is adapted to be controlled through the connections of the brake switch 1 for controlling the application and the release of the brakes.

The magnet valve device 3 comprises a magnet and is provided with a chamber 10 containing a valve 11, said valve having a fluted stem extending through a suitable bore in the casing and engaging in a chamber 12 the fluted stem of a valve 13 contained in chamber 14. The valves 11 and 13 are adapted to be shifted in one direction by operation of the magnet, and when said magnet is deenergized, the pressure of spring 15 against the collared stem 16 in engagement with the valve 13, shifts the valves in the opposite direction.

The magnet valve device 4 comprises a magnet adapted to operate a double beat valve 17 contained in chamber 18, the lower valve having a fluted stem extending through a bore in the casing and engaging the collar of a stem 19, engaged by a spring 20 contained in chamber 21. The fluted stem of the upper valve extends through a chamber 22, connected to the atmosphere through the exhaust passage 23.

The rectifier device 5, is interposed in the circuit from train wire 24 to magnet 3, and is adapted to permit the flow of current only in one direction, such as indicated by the arrow.

The rectifier device 6 is interposed in the circuit from the train wire 24 and to the magnet 4, and is adapted to permit the flow of current only in one direction, such as indicated by the arrow, the direction of flow being opposite to that permitted by the rectifier device 5.

The single train wire 24 is continuous throughout the train, being connected between cars and the locomotive by a suitable flexible connection or jumper 25 and is grounded at the end of the train as shown at 26.

The electro-pneumatic valve equipment 7 is similar to that disclosed in my prior Patent, No. 1,440,421, granted January 2, 1923, and may comprise a quick action triple valve device 27, and a selector valve portion 28, both of which are mounted on a bracket 29, to which the auxiliary reservoir 8 and brake cylinder 9 are also connected.

The quick action triple valve device 27, comprises a casing having a piston chamber 30, connected to the usual brake pipe 31, and containing a piston 32 and a valve chamber 33, connected through passage 34 to the auxiliary reservoir 8, and containing a main slide valve 35 and an auxiliary slide valve 36, adapted to be operated by said piston.

The quick action portion of the triple valve device comprises the usual quick action piston 37, contained in chamber 38, and the vent valve 39, contained in chamber 40, and adapted to be operated by said piston. The usual check valve 41 is also contained in chamber 40.

The selector valve portion 28 comprises a casing having a piston chamber 42 connected through passage 43 with chamber 18 of the magnet valve device 4, and containing a piston 44 subject to the pressure of a coil spring 45 and a valve chamber 46 connected to the triple valve chamber 33 through passages 47 and 48 and containing a slide valve 49, adapted to be operated by said piston.

The magnet valve device 3 and magnet valve device 4 are mounted on a bracket integral with the selector portion casing 28.

The brake switch 1 is separate from the usual automatic brake valve device (not shown) and is adapted to be operated independently, while the automatic brake valve device remains in the usual running position.

In operation, the fluid pressure brake system is charged in the usual manner and fluid from the brake pipe 31 flows to the piston chamber 30 of the triple valve device 27 and thence through feed groove 50 to the valve chamber 33 and through passage 34 to the auxiliary reservoir 8, charging said reservoir in the usual manner.

Fluid under pressure is supplied from the valve chamber 33, through passages 48 and 47, to the selector valve chamber 46 and from passage 47 through passage 51 to the spring chambers 14 and 21.

With the brake switch 1 in running position, as shown in Figure 1 of the drawing, the train wire 24 is connected to the positive pole 52 of the direct current winding of the generator 2, by way of switch contact 53 and wire 54. The circuit is then completed through the negative pole 55 of the generator 2, the wire 56, drum contact 57, wire 58, and ground 59, the train wire 24 being connected at 26 to the ground at the end of the train.

When the positive pole of the direct current winding of the generator is connected to the train wire, current flows through the rectifiers 5 and magnets 3, but the rectifiers 6 prevent the flow of current in this direction to the magnets 4. Thus the magnets 3 become energized while the magnets 4 remain deenergized.

The magnet 4 being deenergized, the double beat valve 17 is seated in its upper position, which permits the flow of auxiliary reservoir fluid from spring chamber 21 into valve chamber 18 and thence through passage 43 to the piston chamber 42 of the selector valve. The fluid pressures thus equalize on the opposite sides of the selector piston 44 and the pressure of the spring 45 holds said piston and slide valve 49 in the upward or release position.

The magnet 3 being energized seats the valve 11 and unseats the valve 13, which permits the fluid at auxiliary reservoir pressure in spring chamber 14 to flow to chamber 12 and thence through passage 60 and pipe 61 to the reservoir 62, charging said reservoir. Passage 60 also leads to the seat of the selector slide valve 49, but it is lapped by the slide valve in release position.

With the triple valve and selector portion both in release position, the brake cylinder 9 is connected to the atmosphere through passages 61, 62, and 86, past the ball check valve 63, passage 64, cavity 65 in the triple valve slide valve 35, passage 66, cavity 67 in the selector slide valve 49 and the atmospheric exhaust port 68.

If it is desired to effect a service application of the brakes, the brake switch 1 is turned to service position, in which a circuit is completed from the ground 26 through the train wire 24, contact 69 of the brake switch, wire 70, contact 71, and wire 56 to the negative pole 55 of the generator direct current winding, through the direct current winding of the generator to the positive pole 52 of the generator, and thence through the wire 54, contact 72, wire 58 to ground 59.

With the negative pole 55 of the direct current winding of the generator 2 connected to the train wire 24, current flows through the magnets 4 and rectifiers 6 in the opposite direction from that in running position, so that the rectifiers 5 prevent the flow of current in this direction, and consequently the magnets 3 are deenergized, while the magnets 4 are energized.

Energization of the magnet 4 seats the double beat valve 17 in its lower position and closes communication between chambers 21 and 18 and connects chamber 18 to chamber 22. Fluid under pressure from the selector valve piston chamber 42 is then vented to the atmosphere through passage 43, double beat valve chamber 18, and chamber 22 to the atmospheric exhaust passage 23, which permits the fluid pressure in valve chamber 46 to shift the selector valve piston 44 and slide valve 49 downward to service position, against the pressure of spring 45. In service position, the brake cylinder passage 66 is lapped by the slide valve 49 and passage 60 is uncovered, so that valve chamber 46 is connected to passage 60.

The magnet 3 being deenergized, the valve 13 is seated and the valve 11 is unseated, which permits fluid under pressure from the auxiliary reservoir 8 to be vented to the brake cylinder through passages 48 and 47, selector valve chamber 46, passage 60, chamber 12 in the magnet valve device 3, past the valve 11, thence through passage 73, past the ball check valve 74, through passage 75, cavity 76 in the selector slide valve 49, passages 77, 64, 62, and 61 to the brake cylinder 9.

If it is desired to limit the degree of brake cylinder pressure and therefore of the brake application, the brake switch is moved to lap position in which a circuit is completed through the train wire 24, contact 78 of the brake switch, thence through wire 79, contact 80, wire 81, the alternating current winding of the generator 2 and through wire 82 to the locomotive ground 83, the train wire being grounded at 26 at the end of the train.

The alternating current then supplied to the train wire 24 passes through both rectifiers 5 and 6 and magnets 3 and 4, thereby energizing both magnets.

The magnet 4 being energized in lap position of the brake switch maintains the double beat valve 17 and the selector piston and slide valve in service position. The magnet 3 being deenergized, the valve 13 is unseated and the valve 11 seated, so that further flow of fluid under pressure to the brake cylinder is prevented.

The brake cylinder pressure may be increased in steps as desired by alternately moving the brake switch between service and lap positions, as will be evident.

The brakes may be released by moving the brake switch 1 to running position in which the positive pole of the direct current winding of the generator 2 is connected to the train wire 24, thereby causing the magnets 3 to be energized and the magnets 4 to be deenergized, as hereinbefore described.

Deenergization of magnet 4 permits the pressure of spring 20 to shift the double beat valve 17 to its upper position and permit the flow of fluid under pressure from spring chamber 21 to chamber 12 and thence through passage 43 to the selector piston chamber 42. The piston 44 and slide valve 49 are then shifted to release position in which the brake cylinder 9 is connected to the atmosphere through the exhaust passage 68.

If the brake switch 1 is left in running position the brakes will be fully released, but if it is desired to effect a graduated release of the brakes, the brake switch may be moved from running to lap position, in which the alternating current is supplied to the train wire 24 which operates the magnets 3 and 4 to prevent any further change in brake cylinder pressure, the same as in graduating the application. Thus, by alternately moving the brake switch between running and lap positions, the brake cylinder pressure may be reduced in steps as desired.

To effect an emergency application of the brakes, the brake switch is moved to emergency position in which the train wire circuit is opened, which causes both magnets 3 and 4 to be deenergized.

The deenergization of magnet 4 operates to maintain the selector piston 44 and slide valve in release position. The deenergization of magnet 3 permits the valve 13 to be seated and the valve 11 to be unseated by the pressure of spring 15. Unseating valve 11 permits the fluid under pressure in the normally charged reservoir 62 to flow to the quick action piston 37 of the triple valve device, through pipe 61, passage 60, chambers 12 and 10, passage 73, past ball check valve 74, passage 75, cavity 76 in the selector slide valve 49, and through passage 84.

Said piston then operates to unseat the brake pipe vent valve 39 and vent chamber 40 to the brake cylinder 9. The fluid under pressure in the brake pipe 31 then lifts the check valve 41 and flows into chamber 40 and thence to the brake cylinder to effect a sudden local reduction in brake pipe pressure in the usual manner.

The sudden local reduction in brake pipe pressure causes the triple valve device to be quickly shifted to emergency position, in which the emergency port 85 registers with the brake cylinder passage 64, so that the fluid under pressure in the auxiliary reservoir 8 is permitted to equalize into the brake cylinder, and apply the brakes in emergency.

It should be noted that since emergency action is caused by opening the train wire circuit, that if the train wire becomes broken or the supply of current fails, an emergency application of the brakes will be automatically effected in the same manner as described above.

If a car equipped with the above described apparatus is placed in a train not provided with electric control, the magnets 3 and 4 will both be deenergized, so that the valve 13 will be seated so as to cut off the supply of fluid under pressure to the reservoir 62 and said reservoir will be vented to the brake cylinder through the open valve 11. Since there is no fluid under pressure in the reservoir 62 under the above conditions, there will be no action of the electric portion, and the equipment of the train will operate only pneumatically in the usual manner.

While in making an electric service application of the brakes, the auxiliary reservoir pressure tends to be reduced, but the pressure in said reservoir will be substantially maintained by flow from the brake pipe through feed groove 50, on account of the automatic brake valve device remaining in running position.

Having now described my invention, what I claim as new and desire to secure by Letters Patent, is:—

1. In an electrically controlled brake, the combination with a single train wire, of electrically controlled devices connected in parallel with said train wire for controlling the brakes and means in series with each device for permitting the flow of current through the corresponding device in one direction only.

2. In an electrically controlled brake, the combination with a single train wire, of two electrically controlled devices connected in parallel with said train wire for controlling the brakes, means in series with one device for permitting flow of current through said device in one direction only, and means in series with the other device for permitting flow of current through said device only in the opposite direction.

3. In an electrically controlled brake, the combination with a single train wire, of two electrically controlled devices connected in parallel with said train wire for controlling the brakes, a rectifier in series with one device for preventing flow of current through said device in one direction and a rectifier in series with the other device for preventing flow of current through said device in the reverse direction.

4. In an electrically controlled brake, the combination with a single train wire, of means for impressing on said wire at one time a direct current flowing in one direction, at another time a direct current flowing in the reverse direction, and at another time, an alternating current and electrically controlled means connected to said wire for controlling the brakes in accordance with the character and direction of flow of current through said train wire.

5. In an electrically controlled brake, the combination with a single train wire, of electrically controlled means connected to said train wire and operated upon a flow of direct current through said wire in one direction for effecting the release of the brakes, upon a flow of direct current through said wire in the reverse direction for effecting an application of the brakes, and upon a flow of alternating current through said wire for placing said means in a lap condition and means for supplying direct current to said wire in either direction of flow, or alternating current.

6. In an electrically controlled brake, the combination with a single train wire, of generator means for supplying direct current and alternating current, a brake switch device for connecting said generator means to said train wire and having one position for supplying direct current flowing in one direction to said train wire, another position for supplying direct current flowing in the reverse direction to said train wire, and another position for supplying alternating current to said wire, and electrically controlled means connected to said train wire and operated by direct current flowing through said train wire in one direction for releasing the brakes, by direct current flowing through said wire in the opposite direction for applying the brakes, and by alternating current flowing through said wire for holding the brakes applied or released, as the case may be.

In testimony whereof I have hereunto set my hand.

THOMAS H. THOMAS.